Patented June 8, 1948

2,442,867

UNITED STATES PATENT OFFICE 2,442,867

PROCESS OF PREPARING PYRIMIDINE COMPOUNDS

Coy W. Waller and James H. Boothe, Pearl River, N. Y., assignors to American Cyanamid Company, New York, N. Y., a corporation of Maine No Drawing. Application March 12, 1946, Serial No. 653,943

9 Claims. (Cl. 260—251)

The present invention relates to a method of preparing heterocyclic organic compounds having biological activity and other useful properties.

The process of the present invention comprises reacting 2,4,5-triamino-6-hydroxyprimidine, a mucohalic acid and para-aminobenzoic acid, esters and amides thereof. The reaction may be illustrated by the following equation:

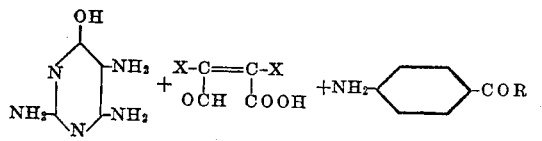 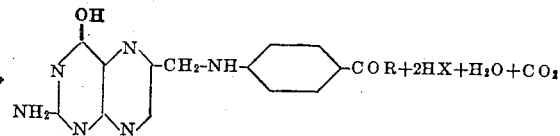

in which X is a halogen radical and R is —OR' or —NR'R", R' and R" being hydrogen or aliphatic radicals.

Generally speaking, the compounds prepared by methods of the present invention are yellow to reddish-brown crystalline solids, difficultly soluble in water and organic solvents. Some are useful in stimulating hemoglobin formation and in the treatment of agranulocytosis. Some of the compounds of the invention appear to possess anti-vitamin properties and are useful for this reason.

Of the reactants, 2,4,5-triamino-6-hydroxypyrimidine is a known compound and may be prepared by methods which have been described in the chemical literature. As is also well known, this compound may exist in one or more tautomeric forms such as:

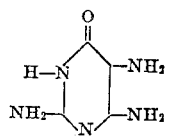

The latter is known as 2,4,5-triaminopyrimidone-6. As will be understood by those in the art, either of the tautomeric forms may be used in the same chemical reactions in like manner and reference hereinafter to the use of one tautomeric form includes the use of the others.

The preferred mucohalic acid is mucobromic acid, one tautomeric form of which is capable of being named as alpha, beta-dibromo-beta-formyl acrylic acid. Other mucohalic acids can be used such as mucochloric acid. These acids can be esterified and esters such as methyl, ethyl, propyl, butyl, etc. can be used in the reactions of the present invention in place of the free acids.

The aminobenzoyl reactants include para-aminobenzoic acid and amides thereof. The biological activity of the resulting product depends, in large measure, upon the particular aminobenzoyl compound employed. When para-aminobenzoic acid is used the resulting product is biologically active as an essential growth factor for Streptococcus fecalis R but is less active with certain other organisms for which other compounds of the invention show activity.

Of the amides of para-aminobenzoic acid, the most important appear to be those of amino acids, particularly of glutamic acid, as, for example, para-aminobenzoylglutamic and poly peptides thereof such as para-aminobenzoylglutamylglutamic acid, para-aminobenzoylglutamylglutamylglutamic acid and others having a plurality of peptid linkages made up of one or more of the various amino acids, such as para-aminobenzoylglutamylglycylglutamic acid. Compounds prepared with these intermediates have a wider range of biological activity and are the preferred products of the present invention. Of course, amides of para-aminobenzoic acid and other amino acids, such as glycine, aspartic acid, leucine, alanine, isovaline, cysteine, and the like, are also important intermediates of the present invention. The amino acids may be natural or synthetic and may be in any of the d, l, or dl forms.

As these amino acid amides possess free carboxyl groups, it will be apparent that the salts and esters thereof may likewise be employed.

It will be understood, of course, that these amides may also be prepared by reacting a suitable amine with the derivative prepared with para-aminobenzoic acid, the mucohalic acid and the triamine.

The reaction may take place over a wide range of temperatures, from about 0° C. up to 100° C. or higher. Likewise, the reaction will take place under a wide range of pH conditions, there appearing to be no limiting acidity or alkalinity. Best results appear to be obtained, however, within the range pH 3 to pH 5.

The reaction may be conducted by mixing all of the three essential reactants together at the same time or the mucohalic acid may be first reacted with one of the other two reactants before adding the third to the reaction mixture.

The reaction is usually conducted with the reactants dissolved or suspended in a solvent such as water, ethyl alcohol, acetone, benzene, carbontetrachloride, chloroform, etc., or mixtures thereof.

The invention will now be described in greater particularity by means of the following examples in which various reaction conditions and reactants are shown. It will be understood, of course, that the invention is not limited to the particular details of these examples since other reaction conditions and reactants within the skill of the art may be employed to produce new and useful compounds falling within the escape of the present invention. All parts are by weight unless otherwise indicated.

*Example 1*

A mixture of 9.9 parts of mucobromic acid, 15.4 parts of p-aminobenzoylglutamic acid and 80 parts by weight of ethyl alcohol was refluxed for two hours on a steam bath. To this mixture was added 5 parts of 2,4,5-triamino-6-hydroxypyrimidine and the mixture was refluxed for one hour more. After adding 5.85 parts of sodium acetate, the refluxing was continued for two hours more. Finally the mixture was diluted with an equal valume of water, made acid with 10 parts of concentrated hydrochloric acid, refluxed for one hour and allowed to stand overnight. It was freed of alcohol and tar and then treated with activated charcoal. The product was isolated by bringing the solution to pH of 3 to 5 and filtering. The product was washed with water, alcohol and ether, and then dried. The product obtained was found to be effective in stimulating the growth of *Lactobacillus casei*.

The free acid is readily dissolved in aqueous solutions of alkalis, with the formation of the corresponding salt. It is also soluble in aqueous solutions of strong acids but has a minimum solubility at a pH of about 3.

*Example 2*

A mixture of 7 parts by weight of mucobromic acid, 7.5 parts of p-aminobenzoic acid and 40 parts of ethyl alcohol was refluxed for two hours. Carbon dioxide was evolved during the reaction. The product was isolated by filtration and boiled with 400 parts by weight of water. The precipitate was collected and boiled with 400 parts more of water. The insoluble material was collected, washed with hot water and alcohol and dried. On analysis the product proved to be alpha-bromo-beta-(p-carboxyanilino)-acraldehyde.

A mixture of .55 part of the product obtained immediately above, 0.28 part of 2,4,5-triamino-6-hydroxypyrimidine and 0.32 part of sodium carbonate was refluxed in aqueous solution for three hours and allowed to stand for 2 days at room temperature. The product obtained was found to be effective in stimulating the growth of *Streptococcus fecalis* R.

The free acid is insoluble in aqueous solutions of strong acids and is extremely insoluble at a pH of about 3. It is soluble in aqueous solutions of bases with the formation of a mono-basic or dibasic salt depending on the concentration and strength of base used.

*Example 3*

To a solution of 1.09 parts of 2,4,5-triamino-6-hydroxypyrimidine in 100 parts of water at room temperature was added 2 parts of mucobromic acid dissolved in ethanol. The isolated and dried product gave the characteristic ultraviolet adsorption curve for 2,4,5-triamino-6-hydroxypyrimidilmucobromic acid.

A mixture of 1.5 parts of 2,4,5-triamino-6-hydroxypyrimidilmucobromic acid, 1.05 parts of p-aminobenzoylglutamic acid, 20 parts of ethanol and 2 parts of pyridine was refluxed for 3½ hours. The product was isolated and dried. It was found to be active in stimulating the growth of *Lactobacillus casei* and to be the same product as that obtained in Example 1.

We claim:

1. A method of preparing compounds having the general formula:

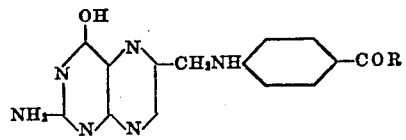

in which R is a member of the group consisting of —OH, and

radicals in which R' and R'' are hydrogen and aliphatic radicals which comprises mixing together 2,4,5-triamino-6-hydroxypyrimidine, a member of the group consisting of mucohalic acids and esters thereof, and a member of the group consisting of para-aminobenzoic acid and amides thereof and recovering the said compound.

2. A method of preparing compounds having the general formula:

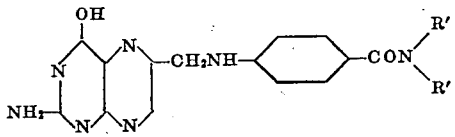

in which R' and R'' are members of the group consisting of hydrogen and aliphatic radicals which comprises mixing together 2,4,5-triamino-6-hydroxypyrimidine, a mucohalic acid and an amide of p-aminobenzoic acid and recovering the said compound.

3. A method in accordance with claim 2 in which the amide of p-aminobenzoic acid is p-aminobenzoylglutamic acid.

4. The method which comprises mixing together 2,4,5-triamino-6-hydroxypyrimidine, a mucohalic acid and para-aminobenzoic acid and recovering therefrom 4-{[(2-amino-4-hydroxy-6-pyrimido [4,5-b] pyrazyl) methyl] amino} benzoic acid.

5. A method in accordance with claim 2 in which the mucohalic acid is mucobromic acid.

6. A method in accordance with claim 2 in which the mucohalic acid is mucochloric acid.

7. A method in accordance with claim 2 in which the amide of p-aminobenzoic acid is an amino acid amide of p-aminobenzoic acid having at least one glutamic acid radical.

8. A method in accordance with claim 2 in which the 2,4,5-triamino-6-hydroxypyrimidine and the mucohalic acid are mixed together first.

9. A method in accordance with claim 2 in which the mucohalic acid and the amide of p-aminobenzoic acid are mixed together first.

COY W. WALLER.
JAMES H. BOOTHE.